Patented Dec. 20, 1932

1,891,743

UNITED STATES PATENT OFFICE

OSWALD BEHREND, OF NITRO, WEST VIRGINIA, ASSIGNOR TO THE RUBBER SERVICE LABORATORIES CO., OF AKRON, OHIO, A CORPORATION OF OHIO

PROCESS OF MANUFACTURING VULCANIZED RUBBER AND PRODUCTS OBTAINED THEREBY

No Drawing.   Application filed February 12, 1930.   Serial No. 427,990.

The present invention relates to the vulcanization of rubber or similar materials such as gutta percha, balata and rubber substitutes. It is particularly directed to the vulcanization of natural rubber wherein the preferred class of materials as hereinafter set forth are employed as accelerators of the vulcanization process.

It is well known that the reaction products of aldehydes and ammonia, such for example as hexamethylene tetramine, acetaldehyde ammonia and the like are accelerators of the vulcanization process. It has now been found that on reacting the ammonia reaction products of aldehydes and more particularly of aliphatic aldehydes with a halogenated aryl hydrocarbon, such for example as benzyl chloride, benzal chloride, benzo trichloride and the like, a rubber accelerator is obtained possessing greatly improved accelerating qualities over that exhibited by the reaction product of the aldehyde and ammonia.

The use of the preferred class of vulcanization accelerators will be fully understood from the following description and examples.

One method whereby one of the preferred class of accelerating compounds, for example a reaction product of hexamethylene tetramine and benzyl chloride, may be prepared is as follows.

Substantially two molecular proportions of hexamethylene tetramine were suspended in an organic solvent, for example ethyl alcohol and substantially an equivalent quantity of benzyl chloride added slowly thereto with agitation at the refluxing temperature of the solvent employed. A vigorous reaction took place. On completion of the addition of the benzyl chloride, agitation of the product was continued for approximately one hour at substantially 70 to 82° C. On completion of the reaction, sufficient alkali, for example an aqueous sodium hydroxide solution was added to the reaction product thus obtained to effect neutralization, after which the sodium chloride formed by the neutralization process was separated, preferably by filtration, and the solvent eliminated from the filtrate preferably by distillation. The residue on drying comprising the desired reaction product of hexamethylene tetramine and benzyl chloride was incorporated in the well known manner in a rubber mix comprising

| | Parts |
|---|---|
| Pale crepe rubber | 100 |
| Zinc oxide | 5 |
| Sulfur | 3.5 |
| Stearic acid | 0.5 |
| Accelerator mentioned | 1.0 |

The compounded rubber stock thus formed was vulcanized by heating in a press in the well known manner for different periods of time at the temperature of 40 pounds of steam pressure per square inch. On testing the vulcanized rubber product it was found to have the following tensile characteristics.

Table I

| Time of cure | Pounds steam pressure | Modulus of elasticity in lbs./in.² at elongations of— | | | Tensile at ultimate break in elongation | |
|---|---|---|---|---|---|---|
| | | 300 per cent | 500 per cent | 700 per cent | Lbs./in.² | Per cent |
| Mins. | | | | | | |
| 30 | 40 | | 186 | 1155 | 2450 | 830 |
| 45 | 40 | 87 | 427 | 2005 | 2660 | 735 |
| 60 | 40 | 116 | 644 | 2975 | 3610 | 730 |
| 90 | 40 | 366 | 1200 | | 4140 | 685 |

A stock identical with that just described with the exception that hexamethylene tetramine was employed as the accelerator, on testing gave the following tensile data.

Table II

| Time of cure | Pounds steam pressure | Modulus of elasticity in lbs./in.² at elongations of— | | | Tensile at ultimate break in elongation | |
|---|---|---|---|---|---|---|
| | | 300 per cent | 500 per cent | 700 per cent | Lbs./in.² | Per cent |
| Mins. | | | | | | |
| 30 | 40 | 7 | 126 | 814 | 1765 | 830 |
| 45 | 40 | 42 | 225 | 1135 | 2160 | 810 |
| 60 | 40 | 52 | 254 | 1448 | 2575 | 790 |
| 90 | 40 | 104 | 498 | 2280 | 3120 | 750 |

It is thus shown that the reaction product of hexamethylene tetramine and benzyl chloride is a very desirable rubber vulcanization accelerator and is far superior to hexamethylene tetramine, the intermediate product from which it was prepared.

As another example of operating the present invention, the neutralized reaction product of substantially equi-molecular proportions of heptaldehyde ammonia and benzyl chloride, was prepared and incorporated in a rubber mix comprising

| | Parts |
|---|---|
| Pale crepe rubber | 100 |
| Zinc oxide | 5 |
| Sulfur | 3.5 |
| Accelerator | 1.0 |

The compounded rubber stock thus formed was cured by heating in a press in the well known manner for different times at the temperature of 40 pounds of steam pressure per square inch. Upon testing the vulcanized rubber product, it was found to possess the following tensile characteristics.

Table III

| Time of cure | Pounds steam pressure | Modulus of elasticity in lbs./in.² at elongations of— | | | Tensile at ultimate break in elongation | |
|---|---|---|---|---|---|---|
| | | 300 per cent | 500 per cent | 700 per cent | Lbs./in.² | Per cent |
| Mins. | | | | | | |
| 15 | 40 | 163 | 405 | 1515 | 3200 | 830 |
| 30 | 40 | 196 | 590 | 2260 | 3745 | 790 |
| 45 | 40 | 256 | 721 | 2810 | 3770 | 760 |
| 60 | 40 | 261 | 805 | 3110 | 3870 | 750 |
| 90 | 40 | 286 | 812 | 3210 | 4045 | 750 |

The above results thus show that heptaldehyde ammonia likewise reacts with an aryl halide to form a desirable vulcanization accelerator capable of producing a cured rubber product possessing high quality.

Another example of the preferred class of accelerating compounds was prepared by reacting substantially two molecular proportions of butyl aldehyde ammonia with a small excess over one molecular proportion of benzal chloride. The product thus formed was neutralized with an alkali, for example an aqueous sodium hydroxide solution and the neutral product thus produced was then incorporated in a rubber stock comprising

| | Parts |
|---|---|
| Pale crepe rubber | 100 |
| Zinc oxide | 5 |
| Sulfur | 3.5 |
| Accelerator | 1.0 |

On vulcanizing the compounded rubber stock and testing the cured rubber product, the following tensile data were obtained.

Table IV

| Time of cure | Pounds steam pressure | Modulus of elasticity in lbs./in.² at elongations of— | | | Tensile at ultimate break in elongation | |
|---|---|---|---|---|---|---|
| | | 300 per cent | 500 per cent | 700 per cent | Lbs./in.² | Per cent |
| Mins. | | | | | | |
| 15 | 40 | 101 | 198 | 574 | 1675 | 905 |
| 30 | 40 | 180 | 389 | 1400 | 2980 | 840 |
| 45 | 40 | 205 | 545 | 1955 | 3175 | 790 |
| 90 | 40 | 231 | 610 | 2350 | 3670 | 780 |

The data as set forth in Table IV shows that the reaction product of butyl aldehyde ammonia with benzal chloride, a dihalogen substituted aromatic hydrocarbon, is a very desirable vulcanization accelerator, and exhibits the qualities of the class set forth.

A further example of the preferred class of compounds is the reaction product of butyl aldehyde ammonia and benzyl chloride. This product, prepared by the process hereinbefore described, after neutralization with an alkali, for example an aqueous sodium hydroxide, was milled in a rubber stock comprising

| | Parts |
|---|---|
| Pale crepe rubber | 100 |
| Zinc oxide | 5 |
| Sulfur | 3.5 |
| Accelerator | 1.0 |

After vulcanizing the compounded stock in the well known manner, on testing it was found to possess the modulus and tensile figures given in Table V.

Table V

| Time of cure | Pounds steam pressure | Modulus of elasticity in lbs./in.² at elongations of— | | | Tensile at ultimate break in elongation | |
|---|---|---|---|---|---|---|
| | | 300 per cent | 500 per cent | 700 per cent | Lbs./in.² | Per cent |
| Mins. | | | | | | |
| 15 | 40 | 151 | 379 | 1350 | 2605 | 810 |
| 30 | 40 | 186 | 515 | 1990 | 3170 | 790 |
| 45 | 40 | 225 | 629 | 2315 | 3865 | 800 |
| 60 | 40 | 224 | 608 | 2415 | 3820 | 780 |

The data given in Table V again sets forth the desirable qualities of the preferred accelerators, in that a product of high tensile strength was produced in a relatively short time.

The reaction product of acetaldehyde ammonia and benzyl chloride has also been prepared by the preferred process described. This product, when compounded in a rubber stock of vulcanization characteristics, was found to possess desirable accelerating properties.

Other reaction products of aldehydes and ammonia with halogenated aryl hydrocarbons than those hereinbefore set forth, may be prepared and incorporated in a rubber mix of vulcanization characteristics prior to the vulcanization thereof. Thus hexamethylene tetramine, acetaldehyde ammonia, and heptaldehyde ammonia may be reacted with benzo trichloride and again propionaldehyde ammonia, the reaction product of aldol and ammonia, the reaction product of acrolein and ammonia and the like may be reacted with benzyl chloride, benzal chloride, benzo trichloride and analogous compounds and employed in a rubber stock.

The present invention is limited solely by the claims attached hereto as a part of the present specification, wherein it is intended to claim the invention as broadly as possible in view of the prior art.

What is claimed is:

1. The process of vulcanizing rubber which comprises heating rubber and sulfur in the presence of an accelerator comprising a reaction product of toluene, containing a halogen substituted methyl group, and a product formed by treating an aliphatic aldehyde with ammonia.

2. The process of vulcanizing rubber which comprises heating rubber and sulfur in the presence of an accelerator comprising a reaction product of toluene containing a chlorine substituted methyl group and a product formed by treating an aliphatic aldehyde with ammonia.

3. The process of vulcanizing rubber which comprises heating rubber and sulfur in the presence of an accelerator comprising a reaction product of toluene containing a chlorine substituted methyl group and a product formed by treating an aliphatic aldehyde containing less than eight carbon atoms with ammonia.

4. The process of vulcanizing rubber which comprises heating rubber and sulfur in the presence of an accelerator comprising a reaction product of benzyl chloride and heptaldehyde ammonia.

5. The process of vulcanizing rubber which comprises heating rubber and sulfur in the presence of an accelerator comprising a neutralized reaction product of substantially equimolecular proportions of benzyl chloride and heptaldehyde ammonia.

6. The vulcanized rubber product prepared by heating rubber and sulfur in the presence of an accelerator comprising a reaction product of toluene, containing a halogen substituted methyl group, and a product formed by treating an aliphatic aldehyde with ammonia.

7. The vulcanized rubber product prepared by heating rubber and sulfur in the presence of an accelerator comprising a reaction product of toluene containing a chlorine substituted methyl group and a product formed by treating an aliphatic aldehyde with ammonia.

8. The vulcanized rubber product prepared by heating rubber and sulfur in the presence of an accelerator comprising a reaction product of toluene containing a chlorine substituted methyl group and a product formed by treating an aliphatic aldehyde containing less than eight carbon atoms with ammonia.

9. The vulcanized rubber product prepared by heating rubber and sulfur in the presence of an accelerator comprising a reaction product of benzyl chloride and heptaldehyde ammonia.

10. The vulcanized rubber product prepared by heating rubber and sulfur in the presence of an accelerator comprising a neutralized reaction product of substantially equi-molecular proportions of benzyl chloride and heptaldehyde ammonia.

In testimony whereof I hereunto affix my signature.

OSWALD BEHREND.